July 29, 1930.   J. N. KINNEY   1,771,931
ATTACHMENT FOR TRACTORS
Original Filed July 18, 1927   4 Sheets-Sheet 3
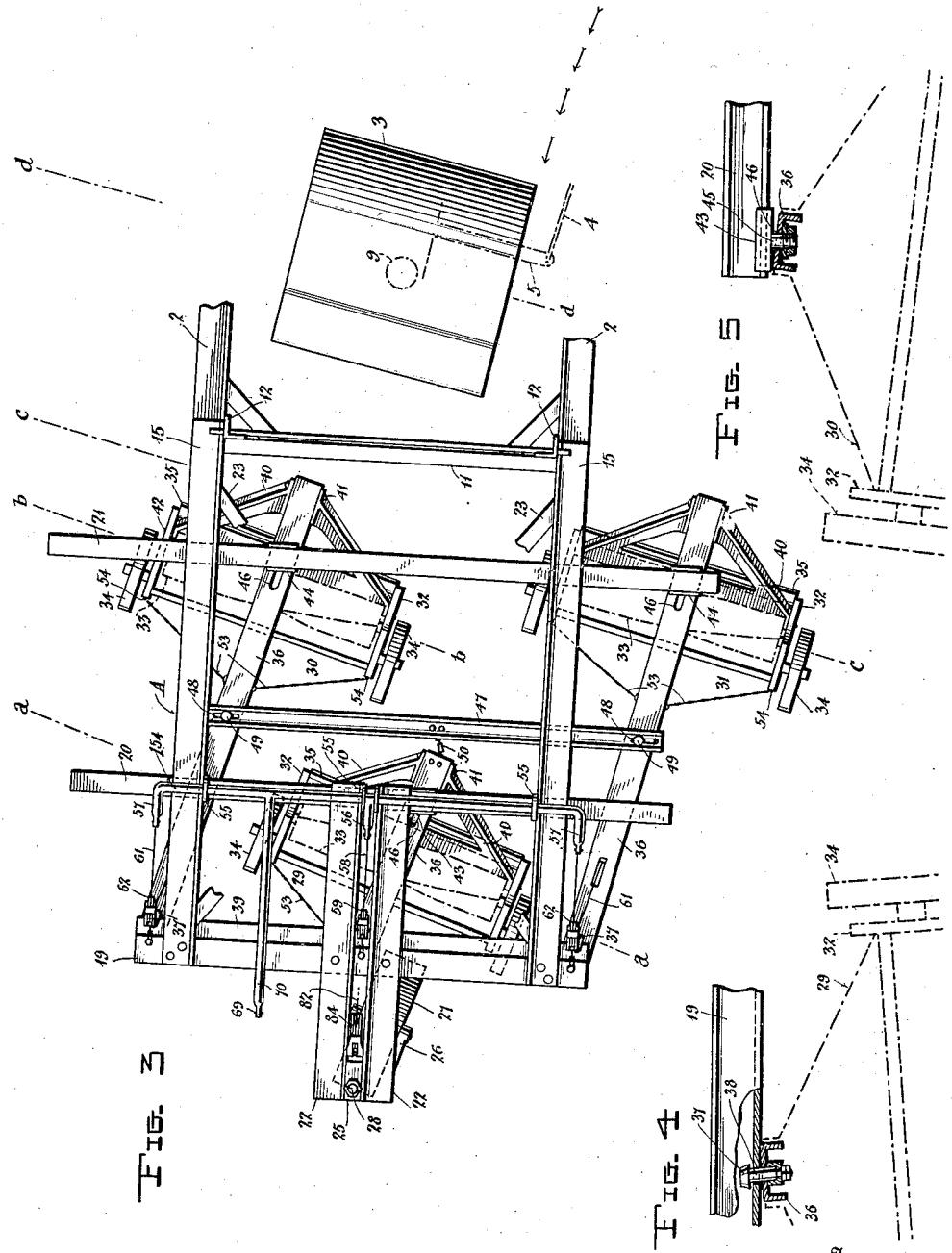
Inventor
Joseph N. Kinney,
By
Attorney July 29, 1930. J. N. KINNEY 1,771,931
ATTACHMENT FOR TRACTORS
Original Filed July 18, 1927 4 Sheets-Sheet 4
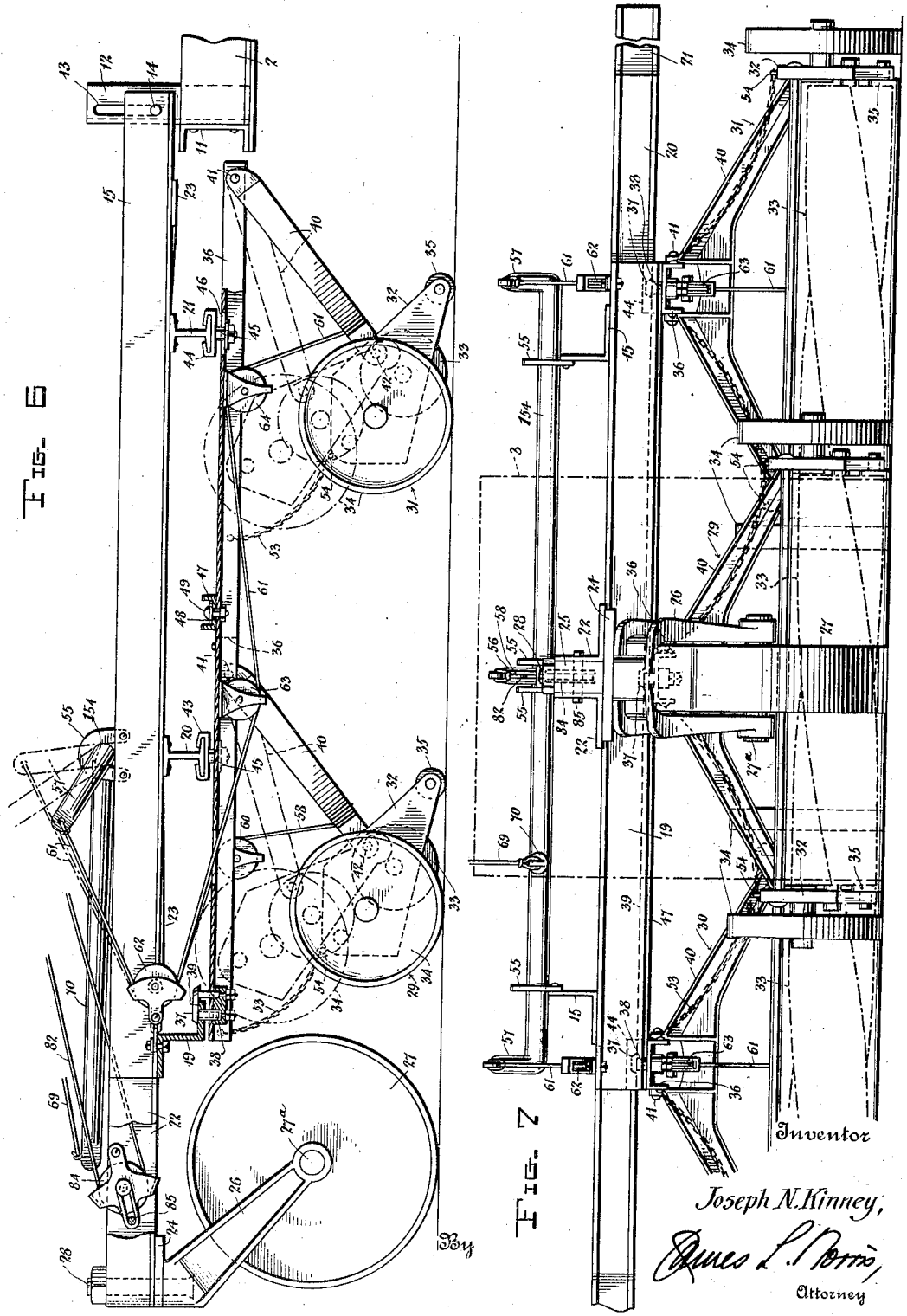
Inventor
Joseph N. Kinney,
By
Attorney Patented July 29, 1930

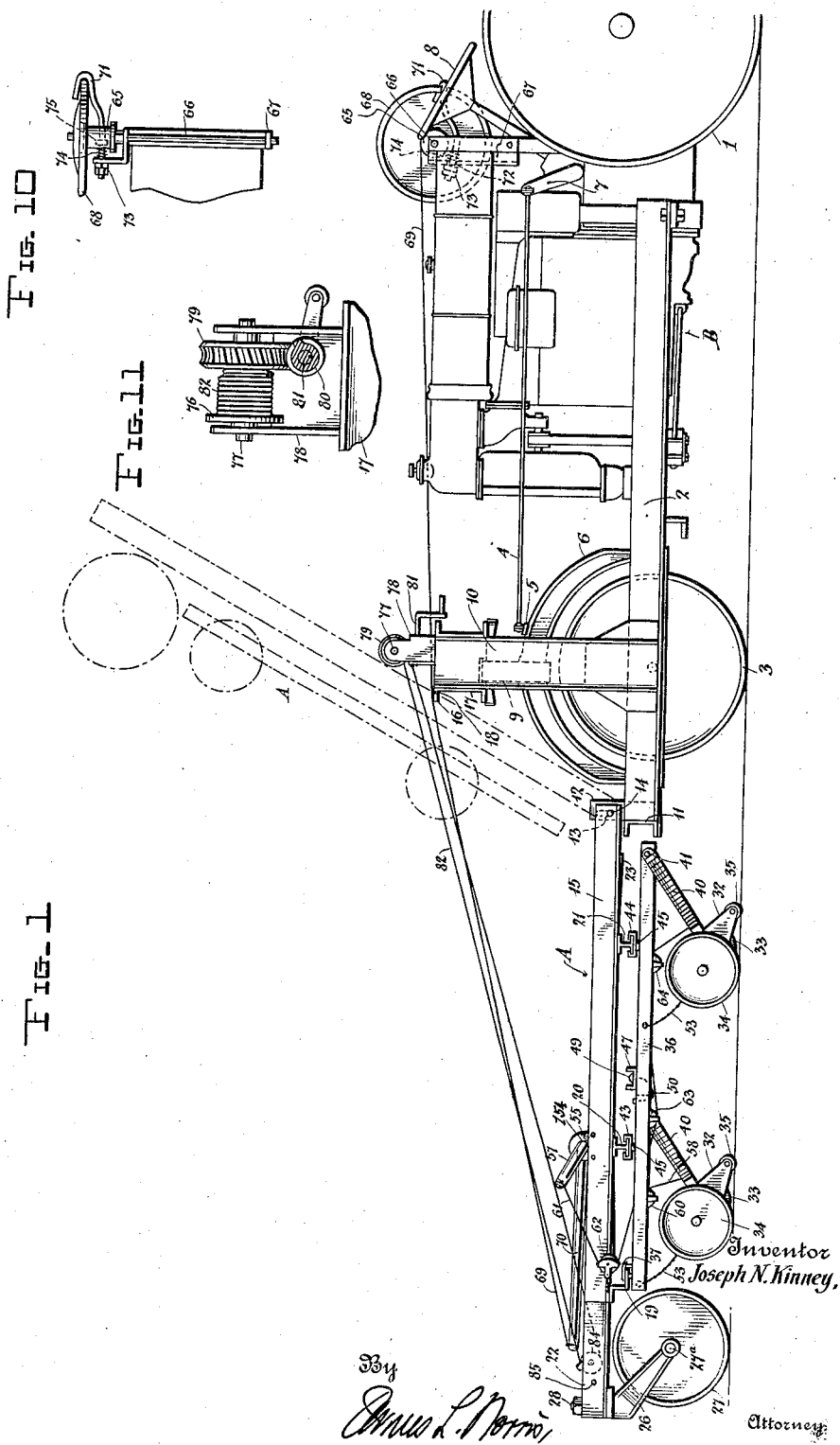

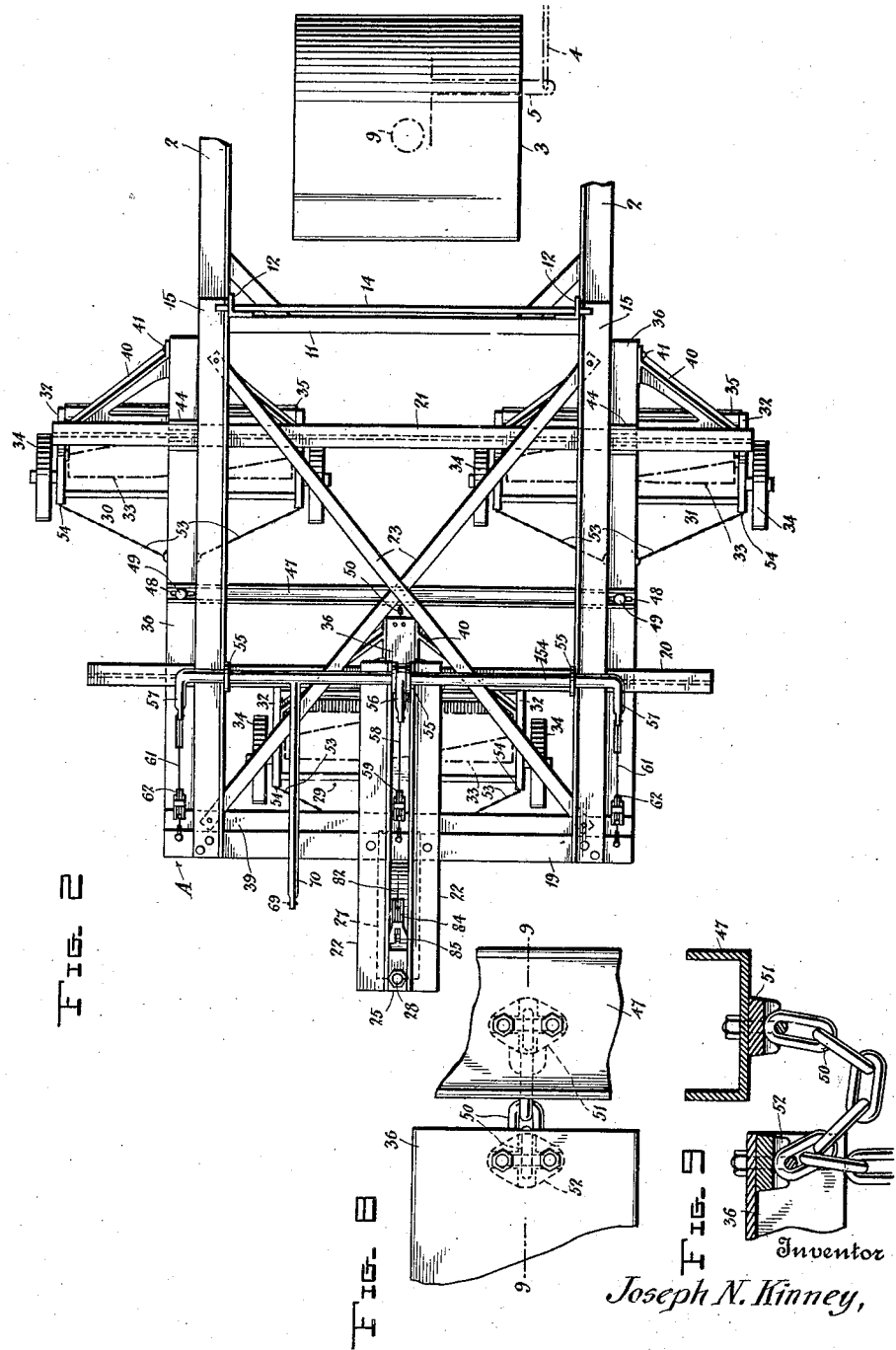

1,771,931

UNITED STATES PATENT OFFICE

JOSEPH N. KINNEY, OF BROOKLYN, NEW YORK

ATTACHMENT FOR TRACTORS

Application filed July 18, 1927, Serial No. 206,594. Renewed June 19, 1930.

The present invention relates to improvements in means for steering coincidentally with propulsion by a member or vehicle adapted for transit over various and irregular surfaces or for cross-country travel, and around concentric arcs when steering, one or more supplementary vehicles flexibly coupled to the power member or vehicle; and incidentally, to improvements and means for governing the functional operations of machinery or equipment comprised in the said supplementary vehicle or vehicles. The particular form of the invention here shown relates to lawn mowers of the class adapted to be attached to and propelled and guided by a tractor, a power roller, or a similar automotive vehicle, but the scope of the invention is not intended to be limited to lawn improving machinery.

Another object is to provide a supplementary vehicle or attachment for an automotive or other power vehicle wherein working units or supplementary vehicles comprised in the supplementary vehicle or attachment may be raised simultaneously to inoperative position to allow backing of the power vehicle and the supplementary vehicle or attachment coupled thereto, and the supplementary vehicle or attachment is so coupled to the power vehicle that it may be raised bodily into a position where it will be carried on the power vehicle so that the supplementary vehicle or attachment may then be readily and conveniently transported from one place to another.

One of the more particular objects of the invention is to provide a novel and improved lawn mower of this class which comprises a gang of mower units so mounted and arranged that they are capable of operating rapidly and efficiently to cut a relatively wide swath which may be either straight or may curve or deviate in either direction laterally to clear trees or other obstructions, the mower units being adapted to accommodate themselves to rough or uneven ground, and means being provided to control the movements of the mower units and to avoid damage thereto, due to dropping of the mower units into holes or to other causes.

To these and other ends, the invention consists in certain improvements and combinations and arrangements of parts all as will be hereinafter more fully described, the features of novelty being pointed out particularly in the claims at the end of the specification.

In the accompanying drawings:—

Fig. 1 is a side elevation of a lawn roller or similar automotive vehicle and a mower attachment coupled thereto in accordance with the present invention, the mower attachment being shown in operative or working position by the full lines and in an inoperative position for transportation by the dotted lines;

Fig. 2 is a top plan view of the forward end of the vehicle and the mower attachment coupled thereto, the steering wheel of the vehicle being set for a straight course and the mower units occupying positions corresponding therewith;

Fig. 3 is a view similar to Fig. 2 but showing the steering wheel of the vehicle set for a turn or deviation from a straight course, the mower units occupying positions corresponding with such curve or deviation;

Figs. 4 and 5 are detail sectional views showing the pivotal connections of the sway bar of one of the mower units with the frame of the attachment whereby the mower unit may accommodate itself to rough or uneven ground;

Fig. 6 is a side elevation with parts thereof in longitudinal section, showing the mower attachment on an enlarged scale;

Fig. 7 is a front elevation of the mower attachment as shown in Fig. 6;

Fig. 8 is a detail in top plan, and Fig. 9 represents a vertical section taken on the line 9—9 of Fig. 8, these figures showing means for limiting or governing the lateral swing of the forward mower unit;

Fig. 10 is a detail view showing the drum for lifting the mower unit; and

Fig. 11 is a detail view showing the drum for lifting the attachment into position for transport on the vehicle.

Similar parts are designated by the same reference characters in the several figures.

Supplementary vehicles or attachments embodying the present invention are applicable generally to any automotive or other power vehicle having suitable couplings and adapted to furnish traction and steering motion, and when a lawn mower attachment is employed, a tractor equipped with suitable wheels and converted into a lawn roller is especially adapted to serve as the power vehicle as it will be capable of not only propelling and steering the mower attachment but will at the same time roll the lawn. The preferred embodiment of the invention as applied to a lawn mower attachment is shown in the accompanying drawings and will be hereinafter described in detail, but it is to be understood that applications of the invention to other uses and constructions equivalent to that shown are contemplated and such will be included within the scope of the claims.

In the example of the invention as shown in the present instance, A designates generally a mower attachment which is coupled to the front of a roller B which is preferably constructed substantially as shown and described in my copending application Serial No. 194,378, filed May 26, 1927, the roller being converted from a tractor of well known type by equipping it with suitable broad rim rear driving wheels 1 and with a frame attachment 2 at the front which provides a mounting for the front or steering roll 3, the course of the roller propelled by its rear driving wheels 1 being determined by a steering rod 4 the forward end of which is connected by a steering arm 5 to a yoke 6 which is connected to and supported by the front or steering roll 3, as fully shown and described in my copending application hereinbefore referred to. The rear end of the steering rod 4 is connected to a rear steering arm 7 which is operatively connected to the steering mechanism of the tractor, such steering mechanism being actuated by the usual steering wheel 8 which may be manipulated by the driver occupying the usual seat of the tractor. The steering mechanism connected to the front or steering wheel 3 serves to turn the latter about the center of the vertical king pin 9 as an axis, this king pin being suitably journalled in and sustained by a bearing in the standard 10 which is fixed to the side members of the frame 2, as is shown and described in detail in my said copending application.

The mower attachment may be coupled in different ways to the roller or other propelling vehicle. Preferably, it is coupled to the front end of the roller or vehicle so that it will be pushed ahead of it, whereby the mower attachment will operate to mow the grass following which the roller will roll the lawn, the two operations being performed concurrently while the vehicle with the mower attachment coupled thereto traverses the lawn. For the purpose of coupling the mower attachment to the front end of the roller or vehicle, the frame 2 of the latter is provided at the junctions of the sides of the frame and the front cross member 11 thereof with upwardly projecting brackets 12 having vertical slots 13 therein, and a transverse coupling bar or rod 14 spans the space between the brackets 12 and fits at its ends in the vertical slots 13.

The mower attachment in its preferred form and as shown in the present instance comprises longitudinal frame members 15 which are preferably spaced apart a distance substantially equal to the transverse spacing of the side members of the roller frame 2 so that the rear ends of the frame members 15 may receive the brackets 12 between them, as is shown in Figures 2 and 3, and the rear ends of the frame members 15 have perforations therein to receive the coupling bar 14. The rear ends of the frame member 15 preferably extend rearwardly over the top of the front cross member 11 of the roller frame and the coupling bar 14 pivotally supports the rear ends of these frame members in such position, the engagement of the bar 14 in the vertical slots 13 allowing for relative vertical displacements between the front end of the roller or other vehicle and the rear end of the mower attachment, arising from inequalities in the surface of the ground, and the bar 14 providing a pivot about which the mower attachment A may be bodily swung from the normal operative position shown by the full lines in Fig. 1 upwardly and rearwardly into the dotted line position shown in that figure. When the mower attachment is swung into the latter position, it is entirely clear of the ground and is supported on the roller or vehicle in a manner which enables the latter to be readily moved from one lawn or other place to another, transporting the mower attachment which is carried thereon. In order to steady or prevent rocking of the mower attachment laterally while it is swung upwardly into the dotted line position shown in Fig. 1 and during movement of the roller or vehicle, the horizontal flange 16 which projects forwardly from the horizontal cross beam 17 forming part of the upright 10 above the front or steering wheel of the roller is notched at its ends as at 18 to receive the side frame members 15 of the mower attachment when the latter is swung upwardly into position for transport, the end portions of the flange lying between the side frame members 15 of the mower attachment forming abutments to engage the inner sides of the frame members 15 and thereby restrain them from lateral displacement.

The frame of the mower attachment preferably embodies, in addition to the longitudinal side frame members 15 thereof, a front cross member 19 and intermediate and rear cross members 20 and 21, these cross members being all riveted, bolted or otherwise rigidly secured to the longitudinal side members. A pair of bars 22 are also provided to extend longitudinally midway between the side frame members 15 and forwardly from the front cross member 19, these bars being riveted, bolted or otherwise rigidly secured to the front and intermediate cross members 19 and 20. Diagonal brace members 23 are preferably secured to the corners of the mower attachment frame to maintain it in rectangular form. The forward ends of the bars 22, which are preferably of angle iron, provide out-turned flanges at their lower edges which seat on the bottom plate 24 of a bearing the body 25 of which is accommodated in the space provided between the vertical flanges of the bars 22, the bearing being riveted, bolted or otherwise secured rigidly to the bars 22 and having its axis arranged vertically. This bearing carries the fork or yoke 26 of a caster wheel 27, the latter being adapted to travel on the ground and to support the forward end of the mower attachment. In the present instance, the fork or yoke 26 has a pin 28 fixed thereto and extended upwardly in the bearing 25 so that this pin may rotate freely in the bearing. This vertical pin is off-set forwardly from the vertical plane of the axis 27$^a$ of the caster wheel 27 so that the wheel 27 will caster freely about its pivot pin 28 and thus adjust itself automatically to any direction of movement of the mower attachment relatively to the ground on which the caster wheel rests.

The frame of the mower attachment which is supported at its forward end by the caster wheel 27 which travels over the ground and at its rear end by the forward end of the roller or other propelling vehicle has arranged beneath it a suitable number of mower units, a gang of these being preferably employed. In the present instance a centrally located mower unit 29 is provided which is located toward the forward end of the attachment or immediately in rear of the caster 27 and a pair of mower units 30 and 31 are provided in rear and at opposite sides respectively of the path of travel of the mower unit 29, the paths of the swaths made by the mower units being thus caused to overlap sufficiently to insure the complete mowing of a swath the total width of which equals substantially the distance between the outer lateral limits of the units 30 and 31. The mower units employed may correspond generally with ordinary lawn mowers the construction and mode of operation of which is well known, it being sufficient for the present purpose to set forth that each mower unit comprises a frame 32 which carries the revoluble cutter or cylinder 33 which is driven by gearing, as is well known, from the traction wheels 34 which roll upon the ground, the rear of the frame 32 being supported by an idler ground-engaging roller 35, the revoluble cutter or cylinder 33 cooperating with a relatively fixed cutter bar as is well known. Forward motion of such mower units while their traction wheels are in engagement with the ground causes the cutters or cylinders thereof to revolve to perform a mowing or cutting operation as takes place in the operation of the usual hand mower.

The mower units are so mounted relatively to the frame of the mower attachment that they may independently accommodate themselves to inequalities of the surface of the ground over which they travel, thereby insuring uniform mowing of the lawn by the different units, and the mower units are capable of accommodating themselves automatically to the paths in which the mower attachment is steered, and hence they will perform their respective mowing operations without interference from changes in the course of travel of the mower attachment. For these purposes, each mower unit is provided with an individual bar 36 which is connected to the mower attachment frame and serves to advance the respective mower unit and to control the path in which it travels. These bars are pivotally connected at their forward ends to the front cross member 19 of the mower attachment frame whereby these bars may swing laterally beneath the frame, a clip 37 being preferably secured for this purpose to the forward end of each bar and having a leg 38 thereof engaged in a perforation in a flange 39 which extends rearwardly from the front cross member 19, as shown in Fig. 6. Each bar 36 is operatively connected to the frame 32 of the respective mower unit by a yoke 40 which serves to push and thereby advance the respective unit as the mower attachment advances. Each of these yokes is pivotally connected to the rear end of the respective bar 36 by pivot pins 41, the bars 36 being preferably formed of channel iron as shown and the pivot pins 41 engaging the downturned flanges which are engaged at their outer sides by the pivot carrying portions of the yoke, as will appear from Fig. 7. The yokes 40 extend forwardly and downwardly and are pivotally connected at their ends to the respective sides of the mower unit frame 32 by the pivot pins 42. The axes of the pivots 41 and 42 are parallel to the axis of the ground-engaging wheels 34 of the mower unit and hence the mower unit may rock freely on the axis 42 while the wheels 34 and roller 35 follow the surface of the ground, thereby enabling the individual mower unit to accommodate itself to irregularities in the ground surface while it travels thereover, and the mower unit may move freely in a direction vertically with respect to the mower frame about the axis 41, the mower unit thus accommodating itself to variations in the elevation of the ground surface. The mower unit and its yoke 40 may also be swung upwardly about the axis 41 to lift the unit from the ground when occasion requires, as will be subsequently explained. In addition to the movements just described which enable the mower unit to accommodate itself to inequalities in the ground surface which involve a fore-and-aft rocking motion or a variation in the elevation of the mower unit, provision is also made for transverse or lateral tilt or rocking motion of the mower unit to compensate for variations in the elevation of the ground engaged by the traction rollers 34 at the two sides of the mower unit. For this purpose, it is preferable to fit the clip 37 loosely to the flange 39 of the cross member 19 of the frame so that the bar 36 which propels and guides each mower unit may rock laterally bodily with the respective mower unit, as is represented diagrammatically in Fig. 4 of the drawing. The bars 36, although free to rock transversely in the manner just described and also swing laterally beneath the frame about the pivots 38 as axes, are maintained in a given horizontal plane beneath the frame by suitable slides which are capable of travelling laterally on appropriate cross members of the frame. The bar 36 which carries the forward mower unit 29 is provided with a slide 43 which is arranged to travel on the cross member 20 and the bars which carry the pair of mower units 30 and 31 carry slides 44 which are arranged to travel on the rear frame cross member 21. The frame cross members 20 and 21 are preferably of I-beam form as shown so that the slides 43 and 44 may bear against the bottoms of the respective beams and overlap the tops of the bottom flanges of the respective beams, as will be clear from Fig. 6. Each slide, like the slide 44 shown in Fig. 5, is provided with a shouldered stud 45 which extends loosely through a longitudinal slot 46 in the respective bar 36 so that the latter will be free to tilt or rock transversely in the manner shown diagrammatically in this figure.

Steering of the vehicle and mower attachment to the right or the left, during forward travel thereof, causes the mower units to swing laterally beneath the attachment frame to conform with the latter course, these lateral swinging movements of the mower units taking place about the pivots 38 which connect the bars 36 to the front cross member 19 of the frame, the slide 43 on the bar 36 of the forward mower unit shifting freely along the frame cross member 20 and the slides 44 attached to the bars 36 of the pair of rear mower units travelling freely on the rear frame member 21. Swing of the rear pair of mower units in either direction laterally of the frame is limited by the slots 46 in which the studs 45 of the slides operate, these slots being made of such length that the shouldered stud 45 of each slide will reach an end of the slot when the respective slide approaches the end of the cross member 21, thereby preventing detachment of the slide from this cross member.

The rear pair of mower units 30 and 31 are also provided with means for governing their positions so that they will not become unduly separated laterally, such means comprising in the present instance a governor bar 47 which is preferably of channel form as shown, this bar extending between the bars 36 which carry the rear mower units 30 and 31 and having longitudinal slots 48 in its ends which receive pivot pins 49, the latter being fixed to the respective bars 36 and working freely in the slots 48. This governor bar will serve to maintain the rear mower units 30 and 31 in approximately parallelism, thereby preventing undue separation of the swaths cut by them, especially when they are being steered on sharply curved courses, but the slots 48 in the governor bar enable these mower units to individually assume working positions which conform with the actual path in which the mower attachment is travelling, as will be hereinafter explained. Also, in order to avoid displacement of the forward mower unit 29 from its approximately central position with respect to the mower units 30 and 31 a connection is made between the bar 36 of this unit and the governor bar 47 for the rear mower units, whereby the forward mower unit will be constrained to cut a swath which will be lapped by the swaths cut by the rear mower units, especially when a sharply curved course is being steered, although the forward mower will be able to individually assume a true or correct working position conforming with the actual direction of movement of the attachment over the ground while being steered on a straight or moderately curved course. Preferably and as shown, this connection comprises a chain or equivalent flexible and linked member 50 one end of which may be fixed by a clamp 51 or other suitable means to the governor bar 47, and the other end of which may be secured adjustably, by a clamp 52 or other suitable means to the rear end of the bar 36 which carries the forward mower unit. This connecting member is shown in detail in Figures 8 and 9. Sufficient slack is provided in the chain 50 to allow the forward mower unit to assume its correct working position, this depending upon the path of travel of the attachment over the ground, but the chain or connecting member will limit the relative lateral movement between the forward mower unit and the governor bar 47 and will thereby maintain the mower units in proper relationship to insure lapping of the swaths cut by them.

While the mower units are free to swing vertically beneath the frame, about the pivots 41 as axes, so that these units may individually accommodate themselves to inequalities in the surface of the ground over which they travel, means is provided to prevent undue descent of the units as might for example occur if any one or more of the units encountered a ditch, furrow or other hole or abnormal depression in the ground and into which the mower unit or units would drop and cause damage thereto or to the attachment. In the present instance each mower unit is provided with a pair of chains 53 the lower ends of which are attached at 54 to the sides of the frame 32 of the respective unit and the upper ends of which are attached to the bar 36 of the respective unit. These chains are provided with sufficient slack to allow the respective mower units to rise and fall freely during their travel over the ground, but should either or both of the driving wheels of the respective mower unit drop into a hole, furrow or other abnormal depression in the ground, undue descent of the mower unit will be prevented by the chain as soon as the slack therein has been removed, and in consequence, the chain will suspend the mower unit above the hole or depression in position to continue its normal travel on the ground surface when such hole or depression has been passed. As these chains are attached to the bars 36 which carry the respective mower units, the amount of slack normally in these chains will not be varied by the lateral swing of the units incident to steering motions of the attachment.

It is desirable to lift the mower units from the ground, at times, as for example, when the vehicle and its mower attachment are being backed from a corner of a lawn or field. Means is provided in the present instance whereby all of the mower units may be simultaneously lifted and lowered. As shown, such means comprises a rock shaft 154 which is mounted in bearings 55 on the frame, this shaft having a crank 56 at the middle thereof and similar cranks 57 at its ends, all of the cranks extending at substantially the same angle from the shaft. The middle crank 56 is connected to a cord or cable 58 which passes around a pulley 59 connected to the front cross member 19 of the frame and then passes around a pulley 60 which is mounted on the under side of the bar 36 which carries the front mower unit, the end of this cord or cable being fixed to the pusher yoke 40 for the front mower unit. Each of the end cranks 57 is connected to a cord or cable 61 which passes around a pulley 62 attached to the front cross member 19 of the frame and near the respective ends of such cross member, each of these cables passing under guide pulleys 63 and over guide pulleys 64 which are secured to the under side of the respective bars 36 which carry the rear mower units, and the terminals of these cables are attached to the pusher yokes 40 of the respective rear mower units. When the rock shaft is rotated in a direction to swing the cranks thereon upwardly and rearwardly, the cables attached to these cranks will be simultaneously tensioned and pulled in a direction to swing the pusher yokes 40 and the mower units attached thereto upwardly or into the dotted line position shown in Figure 6, the mower units being then lifted above the ground so that they will not interfere with movements of the vehicle and the mower attachment in any direction, although the mower units will be restored to operative positions upon release and return of the rock shaft to its normal position, as shown by the full lines in Fig. 6.

The lifting and lowering means just described is preferably controlled by the operator of the vehicle while he occupies the usual driver's seat thereon. The means provided in the present instance for lifting and lowering the lower units comprises preferably a winding drum 65 which is mounted on a shaft 66 supported in bearings on a frame 67 which may be bolted or otherwise attached to the body of the tractor or other vehicle in a position immediately in front of the driver's seat thereon. The drum is connected to a hand wheel 68 so that it will turn therewith, and a cable 69 is attached to this drum and extended forwardly and attached to the free end of a lever 70 which is fixed to the rock shaft 154. Rotation of the hand wheel in a direction to wind the cable 69 thereon will draw the lever 70 upwardly and rearwardly, thereby rocking the shaft 54 in a direction to lift the mower unit. Quickly releasable means is preferably provided for holding the drum against rotation in a direction to unwind the cable, such means comprising preferably a brake arm 71 one end of which is bent to engage or grip the periphery of the hand wheel 68 and the other end of which passes loosely through a hole 72 in the frame 67 and is provided with an adjustable stop which is composed preferably of a pair of nuts 73 which are threaded on this part of the brake arm. A compression spring 74 bears at one end against the arm 67 and its opposite end bears against a shoulder or collar 75 on the brake arm. The brake arm is arranged to engage the periphery of the hand wheel 68 toward the rear thereof while the portion of the brake arm which passes loosely through the hole 72 in the frame 67 is arranged below the axis of the hand wheel. In consequence, the spring 74 tends to swing the wheel-engaging portion of the brake arm upwardly about the adjustable stop 73 as a center, and as this stop is arranged eccentrically of the hand wheel, the brake arm will be thus forced into frictional engagement with the hand wheel and will thus act to prevent unwinding of the cable 69 from the drum 65 although the hand wheel may be rotated in an opposite direction to wind the cable 69 on the drum 65 and thus lift the mower units, as such motion of the hand wheel will tend to swing the brake arm downwardly and thus release its grip upon the hand wheel. While the brake arm will thus act automatically to allow rotation of the hand wheel in a direction to lift the mower units and will hold the hand wheel against retrograde rotation so that the mower units will be held in raised position, the hand wheel may be quickly released to permit prompt dropping of the mower units on to the ground by mere depression of the rear end of the brake arm which is thereby caused to swing about its adjustable stop 73 and to thus disengage from the periphery of the hand wheel.

Hoisting means is provided for swinging the mower attachment upwardly into substantially the dotted line position shown in Fig. 1, when the attachment will be in a position which will enable it to be transported while the vehicle is being moved from one place to another. As shown in the present instance, a winding drum 76 is mounted on a suitable part of the vehicle frame, its shaft 77 in the present instance being journalled in a frame 78 which is mounted on the top of the frame members 10 which are above the front or steering wheel 3. The drum has a worm wheel 79 connected to it and a worm 80 mounted on a crank shaft 81 cooperates with the worm wheel to rotate the drum. One end of a cable 82 is attached to the drum, the other end of this cable being attached at 83 to the vehicle frame, and the intermediate portion of the cable passes around a pulley 84 which is fixed at 85 to the forward portion of the frame of the attachment, it being preferably accommodated in the space formed between the forward frame extension bars 22, as shown. During ordinary use of the mower attachment, the cable 82 is provided with sufficient slack to enable the mower attachment to rise and fall relatively to the vehicle and thus conform with inequalities in the surface of the ground. However, when it is desired to move the vehicle and the mower attachment from one place to another, the crank shaft 81 is rotated in a direction to cause the drum 76 to wind the cable 82 thereon and the winding of this cable swings the mower attachment upwardly about the coupling bar 14 as a pivot until the mower attachment has been brought into the position shown by the dotted lines in Fig. 1, resting in this position against the frame member 17 of the vehicle, lateral sway or tilt of the attachment, while thus raised, being prevented by the engagement of the longitudinal frame members of the attachment in the recesses 18.

In the operation of a mower attachment constructed substantially as hereinbefore described, the attachment, by reason of its coupling to the forward end of the vehicle so that it in effect forms an extension or continuation thereof, will participate in the travelling and steering movements of the vehicle, it being understood that the course of the vehicle and the attachment is determined by the steering wheel or roll 3 of the vehicle. When the vehicle and mower attachment are being steered on a straight course, as is shown in Fig. 2, the mower units 29, 30 and 31 will all travel in straight parallel paths, trailing directly behind their respective pivots 38 which are attached to the front cross member 19 of the frame. The swaths cut by the rear mower units 30 and 31 will overlap the swath cut by the front mower unit, as will be clear from the top plan view shown in Fig. 2, and the front view shown in Fig. 7. When the steering wheel or roll 3 of the vehicle is turned to steer the vehicle and the mower attachment to the right or the left of a straight course as for example, to clear trees or other obstructions, the front caster 27 will automatically assume an angular position to conform with the changed course of travel, and the mower units will also automatically assume angular position about their pivots 38, to conform with the changed course of travel, the mower units having a trailing relation with their pivots 38 which produces a castering effect, and the axes of the mower units will all intersect at the same point of the axis of the steering wheel or roll 3 of the vehicle, so that the mower units have true rolling motions in concentric arcs. For example, as shown in Fig. 3, the axes of the mower units designated by the lines $a$—$a$, $b$—$b$ and $c$—$c$, if continued, will all intersect the axis $d$—$d$ of the steering wheel or roll 3 of the vehicle at the same point. During steering of the vehicle and mower attachment on a curve or other course which deviates from a straight course, the swath cut by the forward mower unit 29 will be overlapped by the swaths cut by the rear pair of mower units 30 and 31, there being consequently no uncut areas between the swaths. In order to insure this result when the vehicle and mower attachment are turned sharply or on a relatively short radius, the bars 36 carrying the rear mower units 30 and 31 are connected by the governing bar 47 which prevents undue spreading apart of these units, and the forward mower unit 29 is connected to the governor bar 47 by the chain 50 which serves to prevent displacement of the forward mower unit from a position approximately midway between the paths of movement of the rear mower units so that the swaths cut by the latter units will overlap the swath cut by the front mower unit. However, while the mower attachment and vehicle are proceeding on a straight course or are being steered on a moderately curved course, the mower units are not restrained by the governor bar 47 and chain or connection 50 but are free to individually accommodate themselves accurately to the actual course in which they are travelling, due to the castering action of the mower units about the pivots 38.

By mounting the bars 36 carrying the mower units so that these bars are free to tilt laterally, as is indicated diagrammatically in Figs. 4 and 5, each mower unit will accommodate itself to unevenness in the ground in a direction laterally of its path of travel, so that both driving wheels of the mower unit will remain in contact with the ground and thus effectually drive the revoluble cutter and furthermore, the lawn will be cut at a uniform height above the ground surface. The pusher yokes 40 which advance the mower units by a force which acts in a direction forwardly and downwardly from the rear end of the respective bars 36 insures continuous contact of the mower units with the ground, notwithstanding that the ground surface may be uneven, and the advance of the mower units by forces applied in the direction described minimizes or prevents bounding of the mower units, especially when they are travelling rapidly over rough or uneven ground, with the result that the mowers may operate efficiently while travelling rapidly over the ground or lawn. The chains 53 normally permit the mower units to move freely vertically or to rock laterally while accommodating themselves to inequalities in the ground surface, but should any one of the mower units encounter a ditch or hole which would be liable to damage the unit, these chains will then act to prevent dropping of the unit into the hole and will sustain the unit in position to resume its operation as soon as the hole is passed.

When the vehicle and mower attachment are to be backed or otherwise moved while the mower units are not in operation, the mower units are all lifted clear of the ground by operation of the hand wheel 68, and the mower units will be held in raised position by the brake arm 71 until the latter is released, whereupon the mower units will drop on to the ground and will then be in condition for operation.

Applications of the invention to uses other than lawn mowing will readily suggest themselves, and such are comprehended within the invention. The supplementary vehicle or attachment is obviously adapted to carry other operating tools, implements or elements in place of the mower units shown, the trailing of such tools or implements in concentric arcs during steering of the power vehicle or member the lifting and lowering of said tools or implements and other controls thereof corresponding substantially with the operation and control of the mower construction shown.

I claim as my invention:—

1. An attachment for automotive vehicles comprising a frame having means for attaching it to the vehicle for propulsion and steering, a plurality of draft members pivotally supported on said frame to swing transversely thereof, and a plurality of operating elements pivotally connected respectively to said draft members in trailing relation with their pivots to conform with the course steered by the attachment, said elements being individually movable vertically relatively to their respective draft members to conform with irregularities in the surface over which they travel.

2. An attachment for automotive vehicles comprising a frame having means for attaching it to the vehicle for propulsion and steering, a plurality of operating elements pivotally connected individually to the frame to swing laterally thereof to conform with the course steered by the attachment, and a transverse connecting bar having slidable connections with the operating elements to limit their relative pivotal movements.

3. An attachment for automotive vehicles comprising a frame, a bar pivoted to said frame to swing laterally beneath it, an operating element arranged beneath said bar, and a member pivotally connecting said operating element to said bar toward its free end for advancing said element while allowing free vertical movements thereof relatively to said bar.

4. A mower attachment for automotive vehicles comprising a frame, a bar pivotally connected toward its forward end to said frame to swing laterally and to rock transversely, a mower unit arranged beneath said bar, and a member pivotally connected to said bar toward its rear end to freely swing vertically with respect thereto but to rock transversely therewith, said member extending forwardly from its connection to said bar and being connected at its forward end to the mower unit and operative to advance it.

5. A mower attachment of the class described comprising a frame, a bar pivotally connected toward its forward end to said frame to swing laterally beneath it, a mower unit, and a yoke pivotally connected to the rear portion of said bar to freely swing vertically with respect thereto, said yoke extending in a direction downwardly and forwardly and having its forward lower end connected to the mower unit to advance it.

6. A mower attachment of the class described comprising a frame, a bar pivotally connected toward its forward end to said frame to swing laterally with respect to it, a slide carried by said bar toward its rear free end and cooperative with the frame to guide said bar during its lateral swinging movements, and a mower unit connected to and guided by said bar.

7. A mower attachment of the class described comprising a frame, a pair of bars pivotally connected toward their forward ends to said frame to swing laterally beneath the latter, slidable means supporting the rear portions of said bars on said frame, mower units connected to the respective bars to be advanced and guided thereby, and a governor bar slidably connected at its ends to said bars for controlling their relative pivotal movements.

8. A mower attachment of the class described comprising a frame, a pair of laterally-spaced bars pivotally connected toward their forward ends to said frame to swing laterally with respect to it, a pair of laterally-spaced mower units connected to the respective bars to be advanced and guided thereby, and a relatively shorter intermediate bar pivotally connected toward its forward end to said frame at a point located between the pivotal connections of said pair of bars therewith, said intermediate bar being pivoted to swing laterally with respect to the frame, and a mower unit located in advance of and opposite to the space between the inner ends of said pair of units and connected to said intermediate bar to be advanced and guided thereby.

9. A mower attachment of the class described comprising a frame, a pair of bars pivotally connected at their forward ends to said frame to swing laterally with respect to it and carrying mower units to be advanced and guided thereby, a governing member connecting intermediate portions of said bars for controlling their relative swinging movements, an intermediate bar arranged between said pair of bars and pivotally connected at its forward end to said frame to swing laterally with respect to it, said intermediate bar carrying a mower unit, and a connection between said intermediate bar and said governing member for controlling the swinging movements of said intermediate bar relatively to said pair of bars.

10. A mower attachment of the class described comprising a frame, a bar pivotally supported on said frame to swing transversely thereof, a mower unit pivotally connected to said bar to be advanced by it and freely movable vertically with respect to it, and means for limiting the descent of the mower unit relatively to the bar and frame.

11. A mower attachment of the class described comprising a frame, a bar pivotally supported thereon to swing laterally and to rock transversely, a mower unit pivotally connected to said bar to be advanced and guided by it, said unit being freely movable vertically relatively to said bar, and flexible means connecting the mower unit to said bar for limiting the descent of the mower unit relatively thereto.

12. A mower attachment of the class described comprising a frame, a plurality of mower units including ground-engaging traction wheels carried by and movable vertically with respect thereto, and means connected to said units and having common operating means operative to lift said units and their traction wheels simultaneously.

13. A mower attachment of the class described comprising a frame, a plurality of bars pivoted toward their forward ends to said frame to swing laterally with respect to it, mower units including ground-engaging traction wheels pivotally connected to the respective bars to be advanced and guided by them, said units and their traction wheels being bodily movable vertically with respect to the respective bars, lifting cables connected to the respective mower units, and a shaft connected to said cables and operative to simultaneously lift the mower units and their traction wheels.

14. A mower attachment for automotive vehicles comprising a frame having means for attaching its rear end to the vehicle for propulsion and steering thereby, a caster supporting the forward end of the frame, a plurality of draft bars pivotally supported on said frame to swing laterally thereof, and a gang of mower units carried respectively by the draft bars and connected thereto to swing laterally of the frame to accommodate them to the course in which the attachment is steered and to freely move vertically relatively to the respective draft bars to accommodate them to the surface of the ground over which they travel.

In testimony whereof I have hereunto set my hand.

JOSEPH N. KINNEY.